(No Model.)
C. L. TRAVIS.
BICYCLE, &c.
No. 585,351. Patented June 29, 1897.
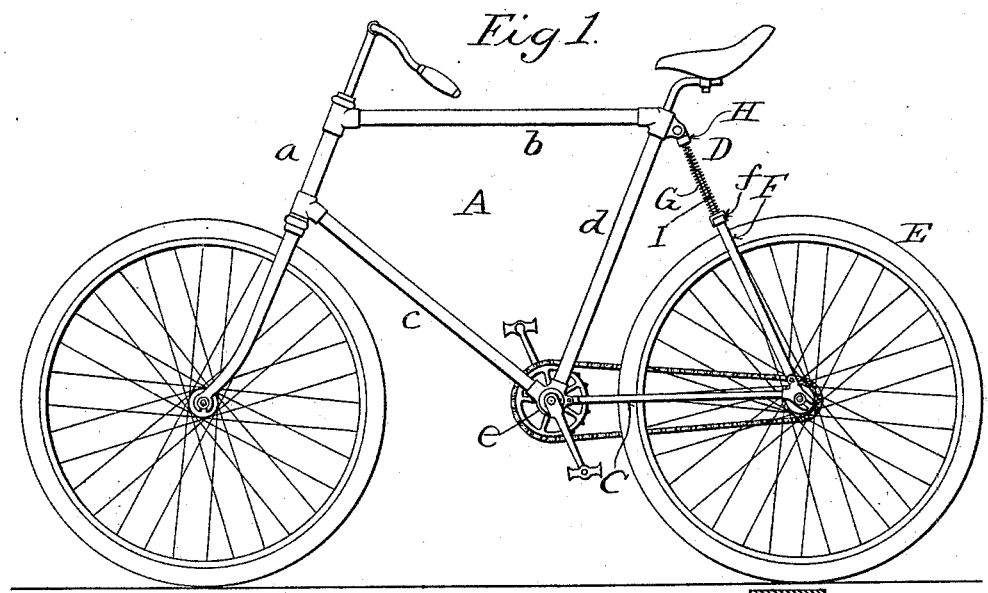
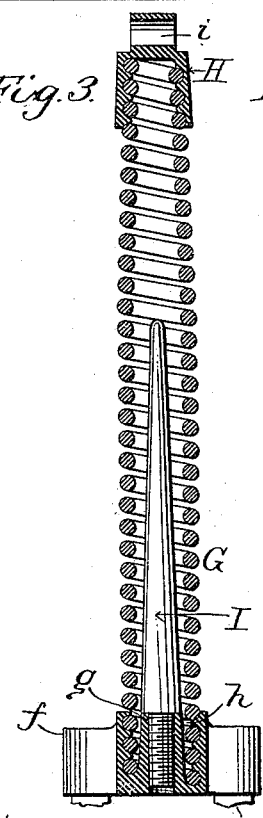
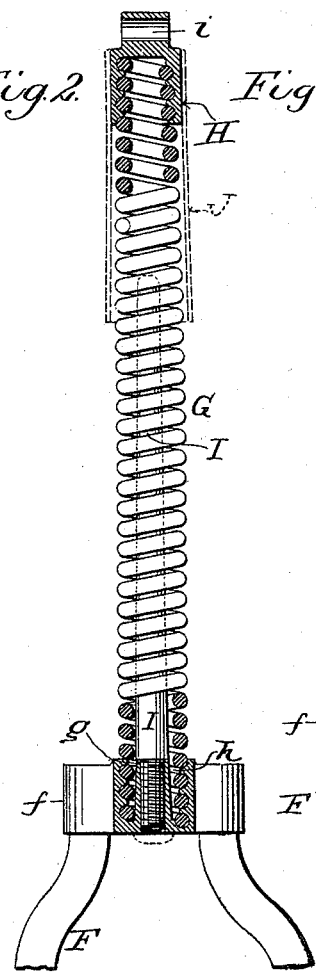
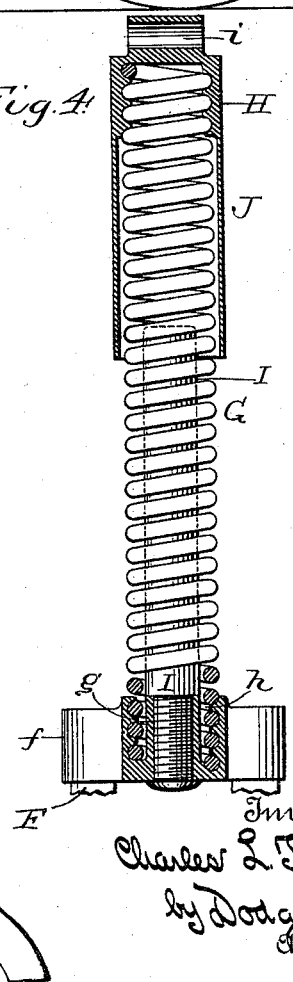
Witnesses
C. C. Burdine
D. E. Burding
Inventor:
Charles L. Travis,
by Dodge & Sons,
Attorneys

UNITED STATES PATENT OFFICE.

CHARLES L. TRAVIS, OF MINNEAPOLIS, MINNESOTA, ASSIGNOR TO THE HYGIENIC WHEEL COMPANY, OF PHILADELPHIA, PENNSYLVANIA.

BICYCLE, &c.

SPECIFICATION forming part of Letters Patent No. 585,351, dated June 29, 1897.

Application filed December 9, 1895. Serial No. 571,579. (No model.)

*To all whom it may concern:*

Be it known that I, CHARLES L. TRAVIS, a citizen of the United States, residing at Minneapolis, in the county of Hennepin and State of Minnesota, have invented certain new and useful Improvements in Bicycles and Like Vehicles, of which the following is a specification.

My invention relates to bicycles and like vehicles, and particularly to those in which a jointed spring-frame is employed.

In the drawings, Figure 1 is a side elevation of a bicycle embodying my improvements; Fig. 2, an elevation, partly in section, of the spring member of the frame; and Figs. 3 and 4, similar views showing modifications or variations of the device.

The object of the present invention is to so construct the frame of the bicycle that it will take up the concussion or shock occasioned by obstructions and irregularities in the roadway or surface over which the vehicle moves.

Referring to Fig. 1 of the annexed drawings, there is shown a bicycle embodying the use of the so-called "diamond frame."

A indicates the front rigid portion of the frame, comprising the head $a$, upper bar $b$, lower bar $c$, and saddle-post standard $d$, at the lower end of which is located the barrel or shell $e$, carrying the pedal-shaft B.

The rear portion of the frame comprises the rear fork C and the telescopic or spring member D. The rear fork C is formed of two tubes or rods jointed or not at their forward ends and flexibly connected to the front portion of the frame in rear of the barrel $e$. No particular manner of making the connection is intended to be herein specified, but such joint or connection should be made as close as practicable to said barrel $e$, in order that there shall be no appreciable variation in distance between the axis of the pedal-shaft and that of the rear wheel under varying adjustments of the rear fork.

E indicates the rear wheel, the axle of which is carried in the rear end of fork C, as usual. Said wheel will be provided with a sprocket-wheel and driven by a chain from a sprocket-wheel on the pedal-shaft or in any other usual way.

The spring member D comprises the fork or brace F, spring G, and socket-piece or cap H. The brace F is flexibly connected to the rear fork C at or near its outer end. The head or cross-bar $f$ of the fork F is formed with an internally-threaded opening $g$ and an annular groove or channel $h$, said channel being provided with a female screw-thread.

I indicates a post or standard mounted in the opening $g$. The lower end of the post is reduced and threaded, so that when it is screwed down to its place the shoulder formed by the reduction bears against the boss or projection formed by the opening $g$ and the annular groove or channel $h$. Said bearing lessens the liability of the breaking of the tenon by precluding the bending of the stem at that point where the screw-thread is formed.

As shown in dotted lines in Fig. 2, the threaded portion of the post I may be long enough to extend through the opening $g$ and be headed or riveted to insure its proper retention in place.

In some instances the post may be formed as an integral part of the head or cross-bar $f$ and said head and post fastened to the bars or tubes of the fork F, or the fork, head, and post may be all formed together. The separate formation of the post is, however, preferable.

It will be noticed upon reference to Figs. 2 and 3 that the post or standard is tapered toward its top, the least taper being shown in Fig. 2 and the greater in Fig. 3. The post shown in Fig. 4 is cylindrical and is intended to completely fill the interior of the coil. The object of these constructions will be hereinafter set forth.

The socket-piece or cap H is flexibly connected to the upper end of the saddle-post standard $d$. Said socket-piece is provided with a transverse opening $i$ to receive a bolt by which it is connected to the saddle-post standard. The interior of the socket-piece is provided with a spiral groove or female thread.

In assembling the parts of the spring member D the spring G is passed over the post or standard I and screwed into the groove or channel $h$. The cap-piece H is then screwed down upon the upper end of the spring; but before the cap is fastened to the saddle-post standard the spring is put under a slight strain, which tends to more securely hold the ends of the spring in place and at the same time to prevent any rattling of the parts.

When the bicycle passes over an obstruction, the spring is compressed and takes up the jar, which would otherwise be communicated to the rider.

At the present time different opinions exist as to the proper construction of bicycle-frames, some contending that the rear section should be so connected with the front section as to preclude any lateral flexure and others maintaining that a limited flexibility will avoid in great measure the severe straining of the frame due to making very short turns at comparatively high speeds.

The construction above set forth is designed and is admirably adapted to meet these different views, since by varying the space between the interior of the spring and the exterior of the post or stem I play may be precluded or permitted, as desired.

In Fig. 4 the post is represented as of a form and size to fill the spring with only sufficient clearance to permit free vertical movement, while Fig. 2 provides for slight lateral play, and Fig. 3, by reason of the greater taper of the post, allows still greater movement.

Under the preferred construction, the post being removable, the taste or desire of the individual rider may be complied with.

In Fig. 2 the spring is shown as being tapered, and under this construction the lower coils will be the first compressed, and the compression from this point on will be a gradual one, the action of the coils becoming stiffer or stronger as the smaller coils come into play. The strength of spring used will be suited to the weight of the rider; but should too light a spring be employed through any oversight the vertical movement of the rear frame will be limited by the upper end of the post coming into contact with the socket or cap piece.

In Figs. 2 and 4 I have shown a collar or sleeve J, connected to the cap-piece, which extends down outside of the spring to about a point on line with the upper end of the post or stem I. With a light spring there might be a slight tendency for the upper unsupported end of the spring to buckle, but this sleeve will prevent any such tendency.

Having thus described my invention, what I claim is—

1. A bicycle provided with a jointed frame, the spring member of which embodies a coiled spring, having a rigid post or standard extending throughout a portion of its length, said parts having a limited movement both laterally and longitudinally with relation to one another, the post serving to prevent too great lateral flexure of the spring.

2. In a bicycle, the combination of the rigid front frame; of the flexible rear frame jointed thereto, comprising a rear-wheel fork, flexibly connected to the front frame at or near the pedal-shaft hanger; a spring member flexibly connected to the outer end of the rear-wheel fork, and to the upper end of the saddle-post standard, said member comprising a fork, a spring, a standard extending into said spring, and a cap-piece or socket forming the connection between the upper end of the spring and the saddle-post standard.

3. A spring member for bicycles or like vehicles, comprising a fork or brace adapted to be connected to the wheel-support, a post or standard rigidly secured to the head of said fork, a spring of a length greater than and encircling said post and also secured to the head of the fork, and a cap-piece or socket secured to the upper end of the spring, adapted to be secured to a fixed portion of the frame.

4. In a bicycle or like vehicle, the combination of the rigid front frame, and the rear frame, the spring member of which comprises a brace or fork, a tapering post or standard rigidly secured to the head of said fork, a coiled spring encircling said post, and a cap-piece or socket adapted to be flexibly connected to the rigid frame and secured upon the upper end of the spring.

5. In a bicycle or like vehicle, the combination of the rigid front frame, and the rear frame, the spring member of which comprises a brace or fork, a tapering post or standard rigidly secured to the head of said fork, a tapering coiled spring encircling said post, and a cap-piece or socket adapted to be flexibly connected to the rigid frame and secured upon the upper end of the spring.

6. A spring member for bicycles and like vehicles, comprising a fork or brace; a coiled spring secured to the head of the fork; a post or standard of a length less than that of the spring also secured to the head of the fork, and within the spring; a cap-piece or socket secured to the upper end of the spring; and a collar or sleeve extending from the cap-piece or socket down over the upper end of the spring to a point slightly below the upper end of the post, whereby the upper end of the spring is prevented from buckling, substantially as described.

In witness whereof I hereunto set my hand in the presence of two witnesses.

CHARLES L. TRAVIS.

Witnesses:
C. C. BURDINE,
HORACE A. DODGE.